(12) United States Patent
Suh

(10) Patent No.: US 8,481,223 B2
(45) Date of Patent: Jul. 9, 2013

(54) STACK FOR FUEL CELL

(75) Inventor: Jun-Won Suh, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 500 days.

(21) Appl. No.: 12/256,262

(22) Filed: Oct. 22, 2008

(65) Prior Publication Data

US 2009/0123809 A1    May 14, 2009

(30) Foreign Application Priority Data

Nov. 14, 2007 (KR) ........................ 10-2007-0116131

(51) Int. Cl.
*H01M 8/04* (2006.01)

(52) U.S. Cl.
USPC ............................ 429/457; 429/458; 429/459

(58) Field of Classification Search
USPC .......................................... 429/457, 458, 459
See application file for complete search history.

(56) References Cited

U.S. PATENT DOCUMENTS

| | | | |
|---|---|---|---|
| 6,270,917 B1 | 8/2001 | Maeda et al. | |
| 6,348,280 B1 | 2/2002 | Maeda et al. | |
| 7,846,608 B2 | 12/2010 | Dong et al. | |
| 2006/0115705 A1 | 6/2006 | Choe et al. | |

FOREIGN PATENT DOCUMENTS

| | | |
|---|---|---|
| CN | 1783555 A | 6/2006 |
| EP | 1 653 540 A | 5/2006 |
| EP | 1 998 395 A | 12/2008 |
| JP | 2000-182636 A | 6/2000 |
| JP | 2000-268843 A | 9/2000 |
| JP | 2001-057219 | * 2/2001 |
| JP | 2001-057219 A | 2/2001 |
| JP | 2001-068131 A | 3/2001 |
| JP | 2006-086137 A | 3/2006 |
| JP | 2006-156398 A | 6/2006 |
| JP | 2008-535189 A | 8/2008 |
| KR | 10-2004-0046825 A | 6/2004 |
| WO | WO 2006/105714 A | 10/2006 |

OTHER PUBLICATIONS

Websters Dictionary Definition of the word "Substantially".*
Websters Dictionary Definition of the word "Symmetrical".*
Webster and Google Dictionary Definiton of "Mirror Image".*

(Continued)

*Primary Examiner* — Ula C Ruddock
*Assistant Examiner* — Frank Chernow
(74) *Attorney, Agent, or Firm* — Knobbe, Martens, Olson & Bear LLP

(57) ABSTRACT

A fuel cell stack for generating electrical energy by an electrochemical reaction of a fuel and an oxidizing gas including a plurality of electricity generating units and a fastening member is disclosed. The plurality of electricity generating units are configured for an electrochemical reaction between the fuel and the oxidizing gas to generate electrical energy, and the fastening member combines the plurality of electricity generating units into a stack. Each electricity-generating unit includes a membrane electrode assembly (MEA) and separators that are provided on each side of the MEA. Each separator comprises a channel on a surface facing the MEA. The channel is divided into a multiple of 2 sub-channels that is greater than 2 on a surface of the separator, and the sub-channels have substantially the same fluid passage length.

15 Claims, 6 Drawing Sheets

OTHER PUBLICATIONS

Chinese Office Action dated Nov. 12, 2010 in related Chinese Patent Application No. 200810174243.1.

Korean Office Action (Korean only) in related KR 10-2007-0116131 dated Jan. 22, 2009.

Office Action from Japanese Patent Office (Japanese only) in related Japanese Application No. JP 2008-145800 dated Oct. 11, 2011.

SIPO Office Action (Chinese + English translation) in related CN 200810174243.1 issued Feb. 2, 2012.

SIPO Office Action (Chinese + English translation) in related CN 200810174243.1 issued Oct. 9, 2012.

Notice of Allowance issued in Japanese Application No. JP-2008-145800.

* cited by examiner

STACK FOR FUEL CELL

CROSS-REFERENCE TO RELATED APPLICATION

This application claims priority to and the benefit of Korean Patent Application No. 10-2007-0116131, filed in the Korean Intellectual Property Office on Nov. 14, 2007, which is hereby incorporated by reference in its entirety.

BACKGROUND

1. Technical Field

The present disclosure relates to a fuel cell stack for generating electrical energy by an electrochemical reaction between a fuel and an oxidizing gas, and more particularly to a fuel cell stack having an improved channel configuration in an electricity generating unit in which the electrochemical reaction occurs.

2. Description of the Related Art

A fuel cell is a device that generates electrical energy by an oxidation reaction of a fuel and a reduction reaction of an oxidizing gas. Fuel cells may be classified as polymer electrolyte membrane fuel cells or direct oxidation fuel cells according to the type of fuel used.

Polymer electrolyte membrane fuel cells generate electrical energy in an reaction between a modified liquid or gas fuel and an oxidizing gas. Polymer electrolyte membrane fuel cells typically exhibit excellent output performance, low operating temperatures, and quick start and response characteristics. Therefore, polymer electrolyte membrane fuel cells are widely used as mobile power sources for vehicles, distributed power sources for buildings, and small power sources for electrical devices.

SUMMARY OF CERTAIN INVENTIVE ASPECTS

Some aspects provide a fuel cell stack including a fastening member in a center area of the stack that reduces a size of the fuel cell stack. Some aspects provide a fuel cell stack in which channels formed on one surface of a separator may be efficiently designed when a plurality of fastening members are provided in an inner center area of the stack.

According to one aspect, a fuel cell stack includes a plurality of electricity generating units and a fastening member. In some embodiments the plurality of electricity generating units is configured for electrochemically reacting a fuel and an oxidizing gas to generate electrical energy. In some embodiments the fastening member combines the plurality of electricity generating units. In some embodiments the electricity-generating unit includes a membrane electrode assembly (MEA) and separators provided on each side of the MEA having a channel on a surface facing the MEA. In some embodiments the channel is divided into a multiple of 2 branches or sub-channels that is greater than 2 on a surface of the separator, and the branches or sub-channels have the same fluid passage length. In some embodiments a plurality of fastening holes for penetrating accumulated surfaces of the fuel cell stack are formed on the separator, and the channel is divided into a multiple of 2 branches or sub-channels with respect to the plurality of fastening holes. In some embodiments the separator is formed in a rectangular shape, and includes a reaction gas inlet for receiving reaction gases including the fuel or the oxidizing gas and a reaction gas outlet for outputting the reaction gas through the channel, and the reaction gas inlet and the reaction gas outlet are positioned at opposite corners of the rectangular shape of the separator.

In some embodiments the channel may be divided into an inlet part where the reaction gas inlet is provided, a branching part where the fastening hole is provided, and an outlet part where the reaction gas outlet is provided. In some embodiments the sub-channels are symmetrical to each other with respect to a first axis passing through a center of a first side in the branching part, and the sub-channels are asymmetrical to each other in the inlet part and the outlet part with respect to the first axis. In some embodiments the sub-channels are asymmetrical to each other with respect to a second axis crossing the first axis in the inlet part and the outlet part. In some embodiments the sub-channels comprising a multiple of 2 branches that is greater than 2 are divided by a barrier rib. In some embodiments the plurality of fastening holes is positioned on a first axis passing through a center of a first side on the rectangular shape of the separator. In some embodiments the plurality of fastening holes are asymmetrical to each other based on a second axis passing through a center of a second side crossing a first side on the rectangular shape of the separator.

In another aspect a fuel cell stack comprises a stack of a plurality of electricity-generating units and a fastening member securing the plurality of electricity-generating units. In some embodiments at least one of the plurality of electricity-generating units comprises a membrane electrode assembly (MEA) comprising a cathode disposed on a first face thereof and an anode disposed on a second face thereof In some embodiments a generally rectangular separator is disposed on each of the first and second faces of the MEA. In some embodiments the separator comprises a reaction gas inlet, a reaction gas outlet, a channel disposed on a face proximal to the MEA, fluidly connecting the reaction gas inlet and the reaction gas outlet. In some embodiments the reaction gas inlet and reaction gas outlets are disposed on opposite corners of the separator. In some embodiments the channel is divided into 2n sub-channels, where n≧2, which have substantially the same fluid path lengths. In some embodiments at least one fastening hole is disposed on the interior of the separator, through which the fastening member extends in securing together the stack. In some embodiments, the number of sub-channels is a multiple of two of the number of fastening holes. Some embodiments of the separator comprise a first axis bisecting longer sides of the separator and a second axis bisecting shorter sides of the separator. In some embodiments, the at least one fastening hole is disposed on the second axis. In some embodiments, the channel comprises an inlet part proximal to the reaction gas inlet, a branching part proximal to the at least one fastening hole, and an outlet part proximal to the reaction gas outlet. In some embodiments the sub-channels in the branching part are symmetrical with respect to the first axis. In some embodiments, the sub-channels in the inlet part and the sub-channels in the outlet part are not symmetrical with respect to the first axis. In some embodiments, the sub-channels are not symmetrical with respect to the second axis.

In another aspect a fuel cell stack comprises a plurality of electricity generating units configured for electrochemically reacting fuel and oxidizing gas to generate electrical energy; and a fastening member securing the plurality of electricity generating units, wherein each electricity generating unit comprises a membrane electrode assembly (MEA) and separators disposed on each side of the MEA, each separator comprises a channel on a surface facing the MEA, and at least one channel is divided into a multiple of 2 sub-channels that is greater than 2, and the sub-channels have substantially the same fluid passage length.

In some embodiments, the separator comprises a plurality of fastening holes, each through which the fastening member penetrates the accumulated surfaces of the fuel cell stack, and the number of sub-channels is a multiple of 2 of the number of fastening holes. In some embodiments, the separator is substantially rectangular, the separator comprises a reaction gas inlet configured for receiving a reaction gas, wherein the reaction gas comprises the fuel or the oxidizing gas, the separator comprises a reaction gas outlet configured for exhausting the reaction gas from the channel, and the reaction gas inlet and the reaction gas outlet are disposed at opposite corners of the rectangular separator.

In some embodiments, the reaction gas comprises the fuel, the reaction gas inlet is a fuel inlet, and the reaction gas outlet is a fuel outlet. In some embodiments, the reaction gas comprises the oxidizing gas, the reaction gas inlet is an oxidizing gas inlet, the reaction gas outlet is an oxidizing gas outlet, and the oxidizing gas inlet and the oxidizing gas outlet are positioned at remaining corners of the rectangular separator.

In some embodiments, the channel comprises an inlet part proximal to and fluidly connected to the reaction gas inlet, a branching part proximal to the fastening hole, and an outlet part proximal to and fluidly connected to the reaction gas outlet, the sub-channels are symmetrical to each other in the branching part with respect to a first axis passing through a center of a first side of the separator, and the sub-channels are asymmetrical to each other in the inlet part and the outlet part with respect to the first axis. In some embodiments, the sub-channels are asymmetrical to each other in the inlet part and the outlet part with respect to a second axis crossing the first axis.

Some embodiments further comprise a barrier rib is disposed between the sub-channels. In some embodiments, the plurality of fastening holes is disposed on a first axis passing through a center of a first side of the rectangular separator. In some embodiments, the plurality of fastening holes is asymmetrical to each other with respect to a second axis passing through a center of a second side of the rectangular separator.

BRIEF DESCRIPTION OF THE DRAWINGS

These and/or other aspects and advantages will become apparent and more readily appreciated from the following description of the preferred embodiments, taken in conjunction with the accompanying drawings of which.

DETAILED DESCRIPTION OF CERTAIN EMBODIMENTS

In the following detailed description, only certain exemplary embodiments are shown and described, simply by way of illustration. As those skilled in the art would realize, the described embodiments may be modified in various different ways, all without departing from the spirit or scope thereof.

A direct oxidation fuel cell generates electrical energy by a reaction between a fuel and an oxidizing gas. A fuel cell includes an electricity generating unit comprising a unit cell for generating electrical energy. The electricity generating unit includes a membrane electrode assembly (MEA), a pair of separators, one provided on each side of the MEA, and a gasket provided at an edge of the MEA, providing an air-tight seal for the space between the pair of separators. In addition, several to tens of the electricity generating units are sequentially arranged to form a stack.

Figure 6:
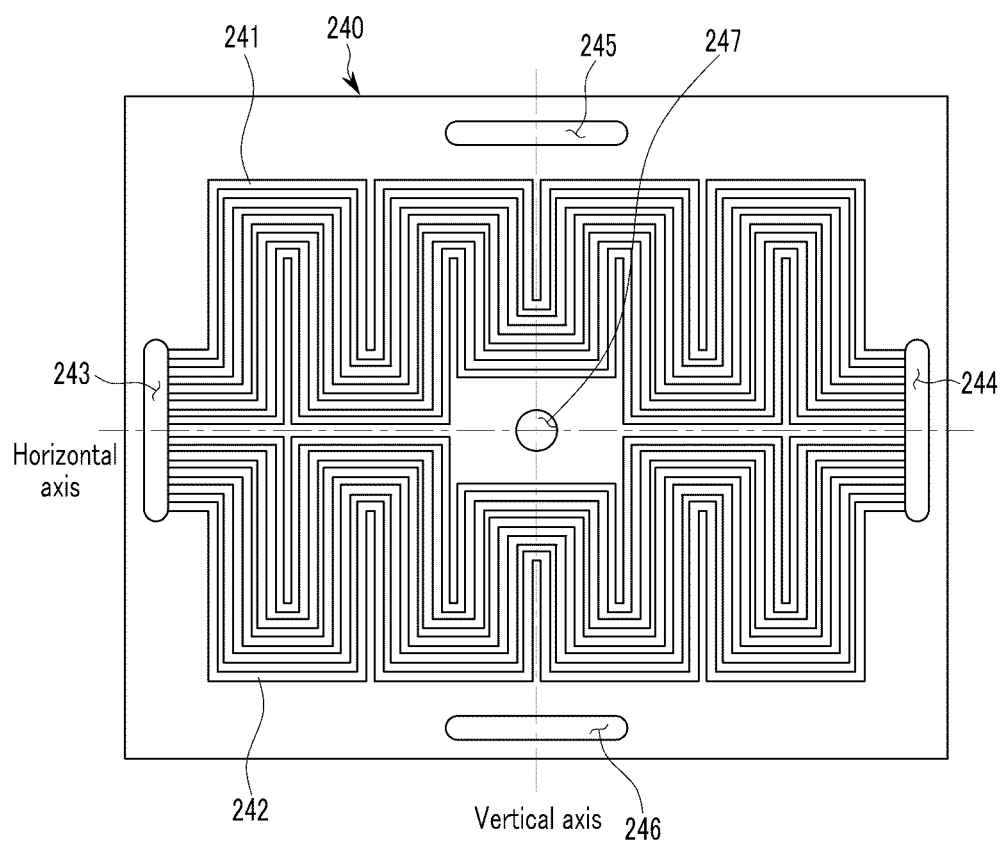
FIG. 6 is a top plan view of a separator of an embodiment of a fuel cell stack.

An embodiment of a separator in a fuel cell stack has a configuration as shown in FIG. 6. The separator 240 shown in FIG. 6 comprises a rectangular shape having longer sides and shorter sides, and includes a channel 241 on a surface contacting the MEA. Channels 241 and 242 formed on the separator 240 are passages for fuel or reaction gases flow including an oxidization gas. The reaction gas enters the channels 241 and 242 through a first reaction gas inlet 243, electrochemically reacts while flowing through the channels 241 and 242, and exits through a first reaction gas outlet 244. In addition, in the fuel cell stack, a plurality of electricity generating units is secured together by a fastening member. Accordingly, the separator 240 shown in FIG. 6 includes a fastening hole 247 in a center area of the rectangular separator 240 so that the fastening member penetrates through the separator 240. The channels 241 and 242 are branched and symmetrical with respect to a horizontal axis bisecting the fastening hole 247. {Replace "is formed" with "comprises" throughout according to US practice.}

However, it is possible to reduce a size of the fuel cell stack by eliminating unnecessary parts from the fuel cell stack. Accordingly, in a separator that has been recently developed, a reaction gas inlet and a reaction gas outlet are disposed at opposite corners of the rectangular separator, and therefore, manufacturing channels 241 and 242 that are symmetrical about the horizontal and vertical axis as shown in FIG. 6 can be difficult.

In addition, in the separator 240 shown in FIG. 6, as an aspect ratio of the rectangle increases, a plurality of fastening holes 247 are typically added along the horizontal axis to improve a fastening force. When the plurality of fastening holes 247 is provided, the channels 241 and 242 fluidly connecting the first reaction gas inlet 243 and the first reaction gas outlet 244 may be symmetrically branched with respect to the horizontal axis. However, when the plurality of fastening holes 247 are provided, channels (not shown) connecting a second reaction gas inlet 245 and a second reaction gas outlet 246 may not be branched with respect to the vertical axis. As described above, when the plurality of fastening holes 247 are provided in the separator 240 shown in FIG. 6, it is difficult to provide channels that are symmetrical with respect to the horizontal axis and the vertical axis, and therefore, fluid passage lengths of the channels may be undesirably different from each other.

Figure 1:
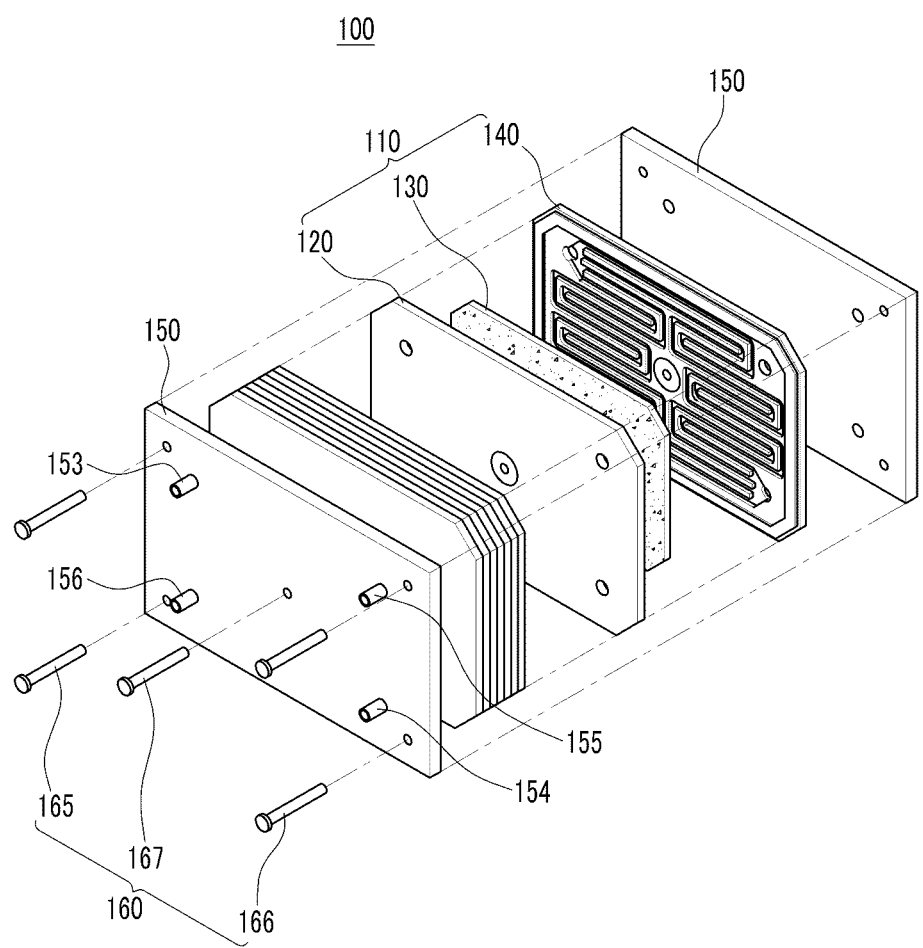
FIG. 1 is an exploded perspective view of a fuel cell stack according to a first exemplary embodiment.

FIG. 1 is an exploded perspective view of a fuel cell stack 100 according to a first exemplary embodiment. As shown in FIG. 1, a fuel cell stack 100 according to the first exemplary embodiment includes an electricity generating unit 110 configured for receiving a fuel and an oxidizing gas and generating electrical energy by an oxidation reaction of the fuel and a reduction reaction of the oxidizing gas. Generally, an alcohol fuel such as methanol and/or ethanol is used as the fuel, and air is used as the oxidizing gas. The electricity generating unit 110 is a minimum unit for generating electricity, which is also referred to as a "unit cell". The fuel cell stack 100 includes a set of sequentially arranged electricity generating units 110, and further includes an end plate 150 provided at each end of the set of electricity generating units 110.

The electricity generating unit 110 includes a membrane electrode assembly (MEA) 130, and separators 120 and 140 respectively disposed on each side of the MEA 130. The MEA 130 includes a cathode and an anode respectively provided on each side of a membrane. The anode oxidizes the fuel to separate it into electrons and protons. The membrane conducts the protons to the cathode, and the cathode reduces the protons with the oxidizing gas. Accordingly, the MEA 130 may generate electrical energy by an oxidation reaction of a fuel and a reduction reaction of an oxidizing gas.

The separators 120 and 140 are formed in a plate shape. The first separator 120, as a cathode separating plate, includes a channel on a surface facing the cathode of the MEA 130. The second separator 140, as an anode separating plate, includes a channel on a surface facing the anode of the MEA 130.

The end plate 150 includes reaction gas inlets 153 and 155 and reaction gas outlets 154 and 156 configured for supplying reaction gases including fuel or oxidizing gas to the electricity generating unit 110. That is, the fuel is input to a channel of the second separator 140 through the fuel inlet 153 formed on the end plate 150, electrochemically reacted, and output through the fuel outlet 154 formed on the end plate 150. The oxidizing gas is input to a channel of the first separator 120 through the oxidizing gas inlet 155 formed on the end plate 150, electrochemically reacted, and output through the oxidizing gas outlet 156 formed on the end plate 150.

The fuel cell stack 100 further includes a fastening member 160 for combining and securing together the electricity generating units 110 and the end plates 150. The fastening member 160 comprises a bolt and a nut for fixing the bolt in the illustrated embodiment. The fastening member 160 includes first fastening members 165 and 166 disposed at an edge area of a set of the electricity generating units 110 and end plates 150, and a second fastening member 167 penetrating a center area of the set of the electricity generating units 110 and end plates 150. As described, since the fuel cell stack 100 has center fastening configuration where fastening force is applied to the center area by the fastening member 160, a force between the electricity generating units 110 at an internal center area is sufficient, and the electrochemical reaction may be efficiently performed.

Shapes of the first separator 120 and the second separator 140 will now be described. However, the shapes of the first separator 120 and the second separator 140 are the same in the illustrated embodiment, and therefore the shape of the second separator 140 using the fuel as the reaction gas will be described in detail.

Figure 2:
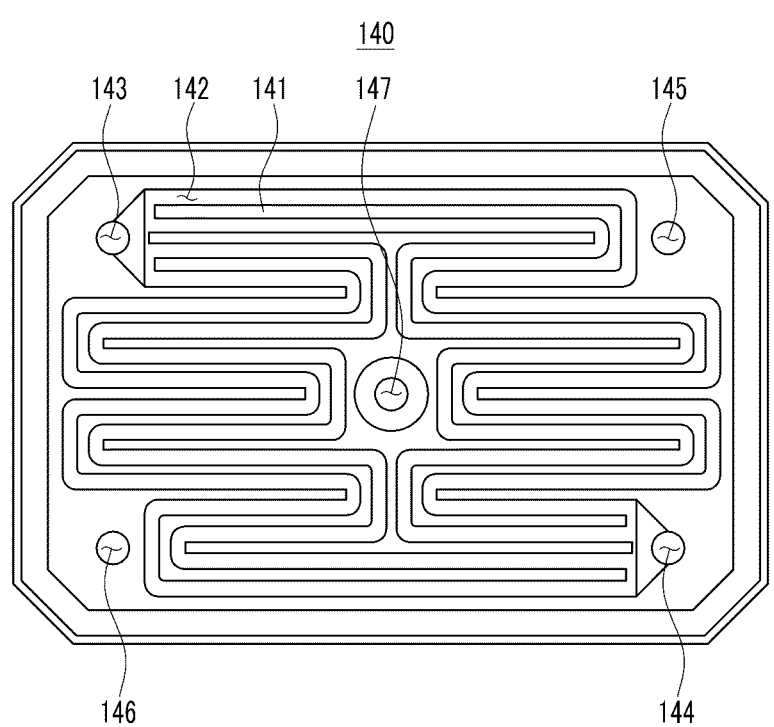
FIG. 2 is a top plan view of a separator shown in FIG. 1.

FIG. 2 is a top plan view of the separator 140 shown in FIG. 1. As shown in FIG. 1 and FIG. 2, the second separator 140 comprises a rectangular plate having longer sides and shorter sides. The second separator 140 includes a channel 142 on a surface facing the MEA 130. The number of channels 142 is a multiple of 2 that is greater than 2, which are divided by a barrier rib 141. The embodiment illustrated in FIG. 2 comprises four channels 142. Each branch of the channel 142 has substantially the same fluid passage length.

The fuel cell stack 100 has the center fastening configuration where a fastening hole 147 penetrates a center area of a surface of the second separator 140. Even when the fastening hole 147 is positioned at the center area of the second separator 140, the channel 142 according to the first exemplary embodiment may comprise a multiple of 2 branches or sub-channels according to the fastening hole 147. Therefore, the channel 142 minimizes or reduces a loss of a reaction area caused by the fastening hole 147, and channel design freedom may be improved.

The second separator 140 includes a fuel inlet 143 that is a manifold through which fuel enters the channel 142, and a fuel outlet 144 that is a manifold through which the fuel exits the channel 142. The fuel inlet 143 and the fuel outlet 144 are respectively positioned on opposite corners among the four corners of the second separator 140. In addition, the second separator 140 includes an oxidizing gas inlet 145 that is a manifold through which oxidizing gas enters the channel of the first separator 120, and an oxidizing gas outlet 146 that is a manifold through which oxidizing gas exits the channel of the first separator 120. The oxidizing gas inlet 145 and the oxidizing gas outlet 146 are respectively positioned at remaining opposite corners of the second separator 140.

Figure 3:
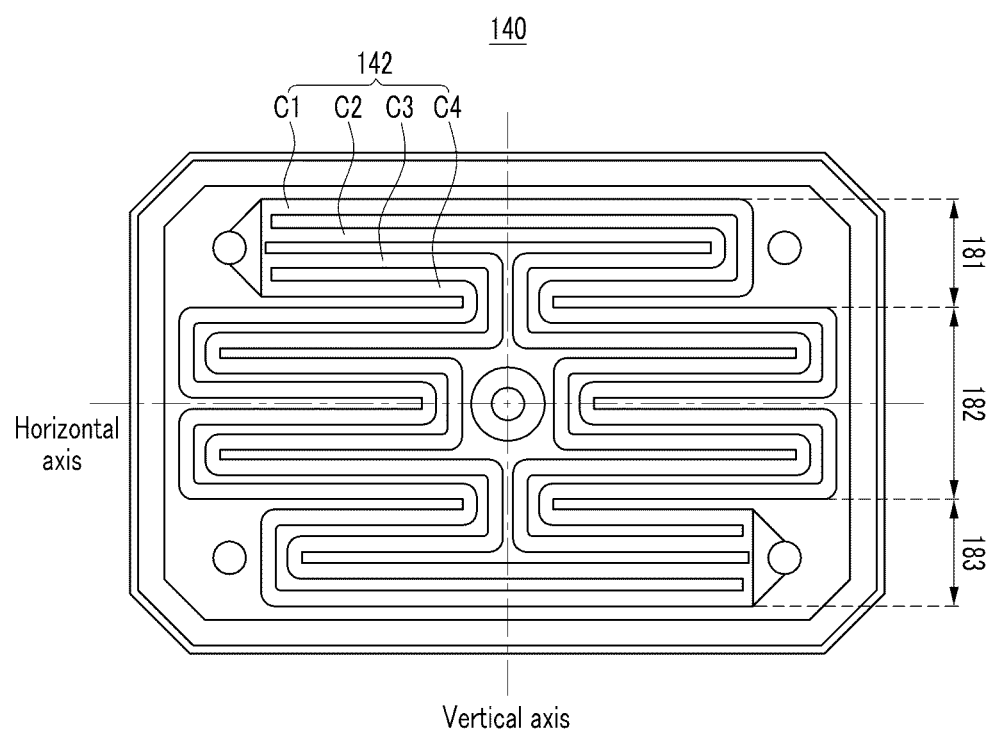
FIG. 3 is a top plan view of the separator shown in FIG. 2, in which respective areas of the channel are shown.

FIG. 3 is a top plan view of the separator 140 shown in FIG. 2, in which respective areas of the channel 142 are shown. An arrangement of the channel 142 on the second separator 140 as shown in FIG. 1 to FIG. 3 will now be described. That is, the channel 142 may be divided into an inlet part 181 where the fuel inlet 143 is provided, a branching part 182 where the fastening hole 147 is provided, and an outlet part 183 where the fuel outlet 144 is provided. The channel 142 comprises a multiple of 2 branches or sub-channels that is greater than 2, and four channels C1, C2, C3, and C4 are exemplified in FIG. 3. Thereby, the channel 142 is divided into two sets of channels C1 and C2, and C3 and C4, in the inlet part 181, are maintained in the branching part 182 based on the fastening hole 147, and are gathered together or rejoined in the outlet part 183.

In this case, the second separator 140 may have a first axis (e.g. a vertical axis in FIG. 3) passing through a center of a first side corresponding to the longer side of the rectangular shape, and a second axis (e.g. a horizontal axis in FIG. 3) passing through a center of a second side corresponding to the shorter side of the rectangular shape. In the illustrated embodiment, the respective two sets of channels C1 and C2, and C3 and C4, are symmetrical to each other with respect to the first axis in the branching part 182. However, in the inlet part 181 and the outlet part 183, the respective two sets of channels C1 and C2, and C3 and C4, are asymmetrical to each other with respect to the first axis since the channels are branched or gathered together. Further, in the inlet part 181 and the outlet part 183, the respective two sets of channels C1 and C2, and C3 and C4, are asymmetrical to each other with respect to the second axis.

Figure 4:
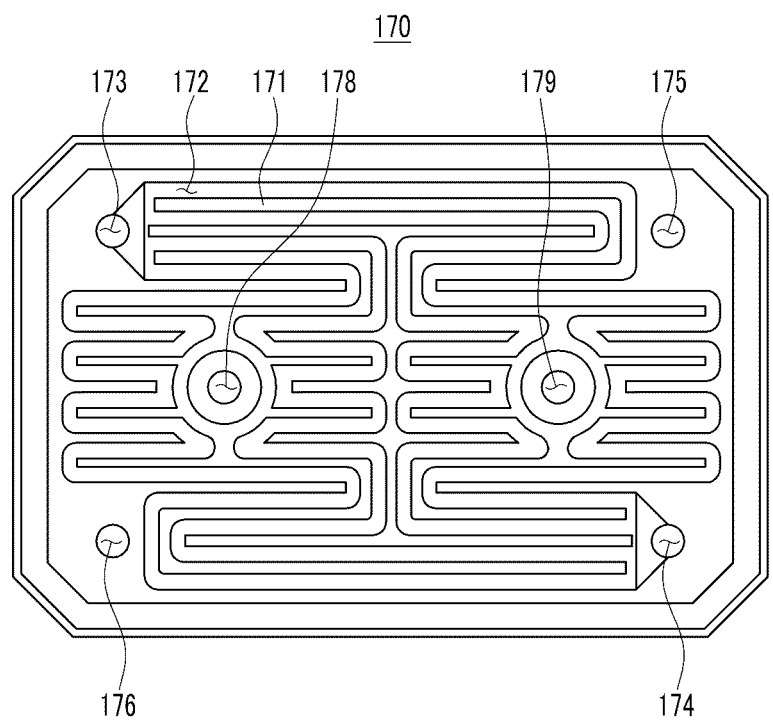
FIG. 4 is a top plan view of a separator according to a second exemplary embodiment.

FIG. 4 is a top plan view of a separator 170 according to a second exemplary embodiment. As shown in FIG. 4, a second separator 170 according to the second exemplary embodiment includes a plurality of fastening holes 178 and 179. That is, even when the center fastening configuration is applied in the fuel cell stack according to the second exemplary embodiment, a plurality of fastening members may be provided to increase a fastening force. Therefore, the plurality of fastening holes 178 and 179 are provided in the second separator 170 to correspond to the plurality of fastening members.

In a like manner of the second separator 140 shown in FIG. 2, the second separator 170 includes a channel 172 on a surface facing the MEA. The channel 172 is divided into the multiple of 2 branches or sub-channels that is greater than 2 by a barrier rib 171. In the embodiment illustrated in FIG. 4, the channel 172 comprises four sub-channels, as in the embodiment illustrated in FIG. 2. The channel 172 comprises a multiple of 2 branches or sub-channels and the divided sub-channels have substantially the same length. The channel 172 is divided into the multiple of 2 branches with respect to the number of fastening holes 178 and 179. That is, as shown in FIG. 4, when the number of fastening holes 178 and 179 is 2, the number of channels is 4.

Accordingly, even when the second separator 170 comprises a plurality of fastening holes 178 and 179, the channels may be arranged to have substantially the same lengths, while reducing or minimizing a loss of a reaction area caused by the plurality of fastening holes 178 and 179.

Figure 5:
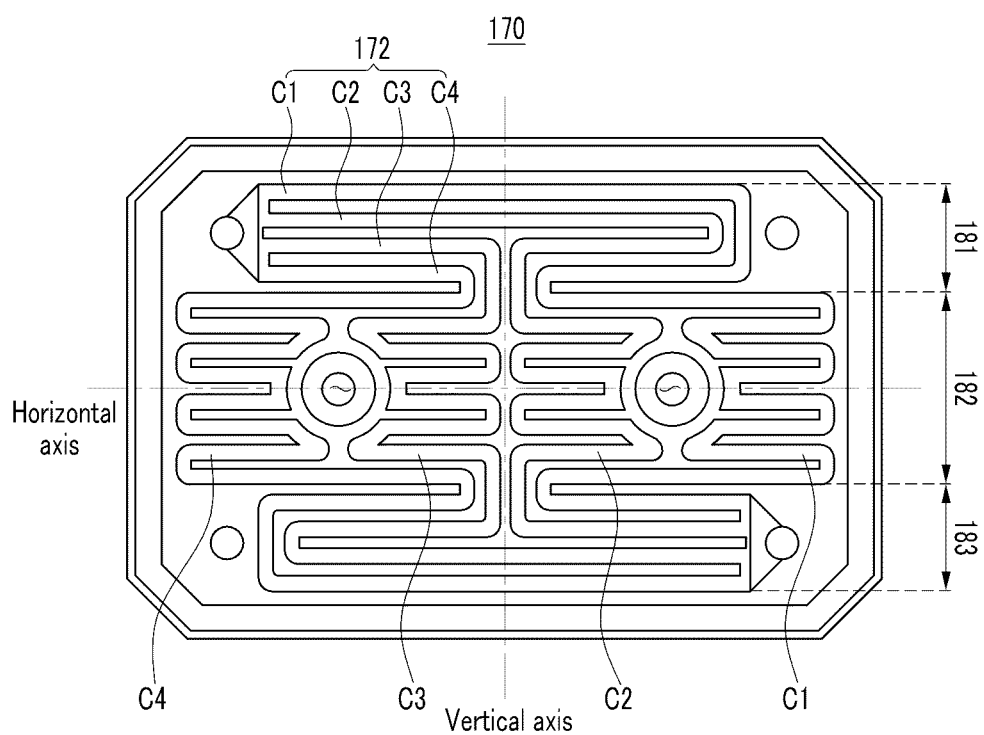
FIG. 5 is a top plan view of the separator shown in FIG. 4, in which respective areas of the channel are shown.

FIG. 5 is a top plan view of the separator 170 shown in FIG. 4, in which respective areas of the channel 172 are shown. As shown in FIG. 1, FIG. 4, and FIG. 5, the channel 172 may be divided into an inlet part 181 where a fuel inlet 173 is provided, a branching part 182 where the fastening holes 178 and 179 are provided, and an outlet part 183 where a fuel outlet 174 is provided. Thereby, the channel 142 is divided into respective sets of two channels C1 and C2, and C3 and C4, in the inlet part 181, the respective sets of two channels C1 and C2, and C3 and C4 are themselves divided in two around the fastening holes 178 and 179 in the branching part 182, and they are rejoined or gathered together in the outlet part 183.

The respective two sets of channels C1 and C2, and C3 and C4, are symmetrical to each with respect to a first axis (e.g. a vertical axis in FIG. 5) in the branching part 182. In this case, in the branching part 182, the plurality of fastening holes 178 and 179 are disposed on a second axis (e.g. a horizontal axis shown in FIG. 5), symmetrical to each other with respect to the first axis. However, in the inlet part 181 and the outlet part 183, the respective two sets of channels C1 and C2, and C3 and C4, are asymmetrical to each other with respect to the first axis since the channels are branched or gathered together. Further, in the inlet part 181 and the outlet part 183, the respective two sets of channels C1 and C2, and C3 and C4, are asymmetrical to each other with respect to the second axis.

Reference numerals that are not described in FIG. 4 and FIG. 5 correspond to and have the same functions as corresponding elements of the second separator 140 shown in FIG. 2 and FIG. 3, and therefore descriptions thereof will be omitted.

As described, in the fuel cell stack according to the exemplary embodiment, since the sub-channels formed on the separator are divided to have the same length, channel design freedom is improved in the center fastening configuration where the plurality of fastening members are provided in a center area of the stack.

In addition, even when the channels are divided to have the same length in the fuel cell stack according to the exemplary embodiment, the size of the fuel cell stack may be reduced.

While certain embodiments have been described in connection with what is presently considered to be practical exemplary embodiments, it is to be understood that the disclosure is not limited to these embodiments, but, on the contrary, is intended to cover various modifications and equivalent arrangements included within the spirit and scope of the appended claims.

What is claimed is:

1. A fuel cell stack, comprising: a plurality of electricity generating units configured for electrochemically reacting fuel and oxidizing gas to generate electrical energy; and a fastening member securing the plurality of electricity generating units, wherein at least one of the plurality of electricity generating units comprises a membrane electrode assembly (MEA) and separators disposed on each side of the MEA, wherein each separator is rectangular, wherein each separator comprises a channel on a surface facing the MEA, wherein at least one channel is divided into a multiple of 2 sub-channels that is greater than 2, wherein the sub-channels have substantially the same fluid passage length, wherein the channel is further divided into an inlet part, a branching part and an outlet part, wherein the sub-channels are mirror images of each other with respect to a first axis passing through a center of a first side of each separator in the branching part, wherein each separator comprises a plurality of fastening holes through which the fastening member penetrates accumulated surfaces of the fuel cell stack, wherein the number of sub-channels is a multiple of 2 of number of fastening holes, and wherein the plurality of fastening holes is disposed on the first axis passing through a center of a first side of each rectangular separator.

2. The fuel cell stack of claim 1, wherein each separator comprises a reaction gas inlet configured for receiving a reaction gas.

3. The fuel cell stack of claim 2, wherein the reaction gas comprises the fuel or the oxidizing gas.

4. The fuel cell stack of claim 3, wherein each separator comprises a reaction gas outlet configured for exhausting the reaction gas from the channel.

5. The fuel cell stack of claim 4, wherein the reaction gas inlet and the reaction gas outlet are disposed at opposite corners of each rectangular separator.

6. The fuel cell stack of claim 5, wherein the reaction gas comprises the fuel, wherein the reaction gas inlet is a fuel inlet, and wherein the reaction gas outlet is a fuel outlet.

7. The fuel cell stack of claim 5, wherein the reaction gas comprises the oxidizing gas.

8. The fuel cell stack of claim 7, wherein the reaction gas inlet is an oxidizing gas inlet.

9. The fuel cell stack of claim 7, wherein the reaction gas outlet is an oxidizing gas outlet.

10. The fuel cell stack of claim 7, wherein the oxidizing gas inlet and the oxidizing gas outlet are positioned at remaining corners of each rectangular separator.

11. The fuel cell stack of claim 5, wherein the inlet part is positioned proximal to and fluidly connected to the reaction gas inlet, wherein the branching part is positioned proximal to the fastening hole, and wherein the outlet part is positioned proximal to and fluidly connected to the reaction gas outlet.

12. The fuel cell stack of claim 11, wherein the sub-channels are asymmetrical to each other in the inlet part and the outlet part with respect to the first axis.

13. The fuel cell stack of claim 12, wherein the sub-channels are asymmetrical to each other in the inlet part and the outlet part with respect to a second axis crossing the first axis.

14. The fuel cell stack of claim 5, further comprising a barrier rib disposed between the sub-channels.

15. The fuel cell stack of claim 1, wherein the plurality of fastening holes is asymmetrical to each other with respect to a second axis passing through a center of a second side of each rectangular separator.

* * * * *